United States Patent
Berman et al.

(10) Patent No.: US 10,674,210 B2
(45) Date of Patent: Jun. 2, 2020

(54) SYSTEM AND METHODS FOR FACILE, INSTANT, AND MINIMALLY DISRUPTIVE PLAYBACK OF MEDIA FILES

(71) Applicants: Matthew Berman, Winter Park, CO (US); Ravi Gadhia, Los Angeles, CA (US)

(72) Inventors: Matthew Berman, Winter Park, CO (US); Ravi Gadhia, Los Angeles, CA (US)

(*) Notice: Subject to any disclaimer, the term of this patent is extended or adjusted under 35 U.S.C. 154(b) by 0 days.

(21) Appl. No.: 15/544,543

(22) PCT Filed: Jan. 19, 2016

(86) PCT No.: PCT/US2016/013946
§ 371 (c)(1),
(2) Date: Jul. 19, 2017

(87) PCT Pub. No.: WO2016/118519
PCT Pub. Date: Jul. 28, 2016

(65) Prior Publication Data
US 2018/0014066 A1 Jan. 11, 2018

Related U.S. Application Data

(60) Provisional application No. 62/191,321, filed on Jul. 11, 2015, provisional application No. 62/105,198, filed on Jan. 19, 2015.

(51) Int. Cl.
H04N 21/443 (2011.01)
H04N 21/845 (2011.01)
(Continued)

(52) U.S. Cl.
CPC .... *H04N 21/4438* (2013.01); *H04N 21/25891* (2013.01); *H04N 21/26258* (2013.01); *H04N 21/439* (2013.01); *H04N 21/4312* (2013.01); *H04N 21/4316* (2013.01); *H04N 21/472* (2013.01); *H04N 21/47217* (2013.01);
(Continued)

(58) Field of Classification Search
None
See application file for complete search history.

(56) References Cited

U.S. PATENT DOCUMENTS

| 8,850,471 B2 * | 9/2014 | Kilar | H04N 21/812 725/32 |
| 9,426,519 B1 * | 8/2016 | Lewis | H04N 21/435 |

(Continued)

*Primary Examiner* — Mulugeta Mengesha
*Assistant Examiner* — Charles N Hicks

(57) ABSTRACT

Provided herein are novel systems and methods of digital content delivery designed to be easy, instant, and minimally disruptive for the user. The novel systems and methods of the invention can provide the device user with an instant and ephemeral snippet of entertaining media, in a metered presentation controlled by the user. The system is minimally disruptive in that the user can summon a video clip or other media content with a simple input, whereupon a clip is instantly played for the user. Upon reaching the end of the media presentation, the media player window self-closes and returns the user's device to the exact state it was in prior. In this way, a user can enjoy a short, entertaining pause without substantially interrupting their previous activity on the device.

11 Claims, 8 Drawing Sheets

(51) Int. Cl.
  *H04N 21/431*  (2011.01)
  *H04N 21/472*  (2011.01)
  *H04N 21/258*  (2011.01)
  *H04N 21/262*  (2011.01)
  *H04N 21/439*  (2011.01)
  *H04N 21/81*   (2011.01)

(52) U.S. Cl.
  CPC ....... *H04N 21/812* (2013.01); *H04N 21/8456* (2013.01); *H04N 21/258* (2013.01)

(56) References Cited

U.S. PATENT DOCUMENTS

| | | | |
|---|---|---|---|
| 2002/0016736 A1* | 2/2002 | Cannon | G06Q 30/02 |
| | | | 705/14.4 |
| 2006/0023900 A1 | 2/2006 | Erhart et al. | |
| 2010/0262618 A1 | 10/2010 | Hedinsson et al. | |
| 2011/0299833 A1 | 12/2011 | Ikeda | |
| 2014/0140506 A1* | 5/2014 | Saremi | H04N 7/1675 |
| | | | 380/212 |
| 2014/0359656 A1* | 12/2014 | Banica | H04N 21/812 |
| | | | 725/32 |

\* cited by examiner

FIG. 1

| Step 1. The user is using a Configured Device |

| Step 2. System servers transmit a series of media files to the device, the media files comprising playlist order metadata. The files are stored in a content cache |

| Step 3. The user inputs a playback initiation command |

| Step 4. A media player window is displayed over any other open windows. The media player selects the next-in-line media file, based on the playlist order metadata and playes the selected media file in the player window. |

| Step 5. Clip playback is completed, and the media player window closes. The window order extant at the time the clip playback command was input is restored. |

FIG. 2

| Step 1. The user is utilizing a Configured device |

| Step 2. The user initiates clip playback by inputting a playback initiation command. A request for a clip is transmitted to System servers. |

| Step 3. A Content Manager function on the System servers selects a compatible clip from System Library, and streams the clip media file to the device. |

| Step 4. A System application residing on the device activates a media player application to play the incoming streamed media file. |

| Step 5. Clip playback is completed, the player window closes. The window order is restored to the state extant at the time the clip initiation command was received. |

FIG. 3.

| Step 1: The user is utilizing a Configured device. |

| Step 2: System servers transmit a list of links to the device, each link comprising a file source address and playlist order data. |

| Step 3: User initiates playback by inputting a playback initiation command. |

| Step 4: The next-in-line link is selected based on playlist order data and the link is accessed by the device. |

| Step 5: The media file is streamed to the device and played in a media player window that is displayed on top of any other open windows. |

| Step 6: Clip playback is completed, and the media player window automatically closes. |

FIG. 4.

Step 1: The user is utilizing a Configured Device.

Step 2: User initiates playback by inputting a playback initiation command

Step 3: The current application is suspended or closed, with any necessary data or settings required to restore the application being saved.

Step 4: A media player application is opened, and a clip media file a is retrieved from a clip source and is played on the display screen of the device

Step 5: Clip playback is completed, and the media player application and window are closed.

Step 6: The previously current application is re-opened. The user's session is restored to its previous state using saved data and settings.

FIG. 5

Step 1: The user is watching initial TV content from a first channel.

Step 2: User initiates System clip playback by inputting a playback initiation command on a remote control.

Step 3: The command is received by the TV and translated into a command to switch the input channel to a clip source.

Step 4: A media file from the clip source is played on the TV screen.

Step 5: Upon clip completion, the input channel switching functions of the TV return the TV's input stream to the initial content source.

SYSTEM AND METHODS FOR FACILE, INSTANT, AND MINIMALLY DISRUPTIVE PLAYBACK OF MEDIA FILES

CROSS-REFERENCE TO RELATED APPLICATIONS

This application claims the benefit of priority to PCT International Application Number PCT/US2016/013946, entitled "System and methods for facile, instant, and minimally disruptive playback of media files," filed on Jan. 19, 2016, which claims priority to U.S. Provisional Application No. 62/191,321, entitled "System and methods for instant and minimally disruptive playback of content on a user's device," filed on Jan. 19, 2015, and U.S. Provisional Application No. 62/105,198, entitled "System and methods for instant and minimally disruptive playback of content on a user's device," filed on Jul. 11, 2015, each of which is incorporated by reference herein in its entirety.

BACKGROUND OF THE INVENTION

The people have an insatiable appetite for digital distraction. Social media platforms, video "tube" platforms, and other content providers serve digital content to hundreds of millions of users each day, including social media posts, video clips, images, animations, text, and music files. These content delivery systems follow the basic business model of aggregating huge amounts of content, serving that content to users, and monetizing the users' interactions with the platform. Accordingly, the prior art content delivery systems employ what can be described as a "browsing experience." Individual content items are served along with advertisements, links, and the option to scroll through or link to an unlimited stream of additional content. The entire experience is designed to capture the attention of the user for an extended period of time in order to increase revenue generation for the platform.

In some cases, the user may prefer a less disruptive experience, for example a metered and ephemeral media presentation. Ephemeral media presentations are known in the prior art, in the form of pop-up advertisements, for example, which users are compelled to watch before accessing requested content. However, the user does not control the playback or content of pop-up advertising.

In some cases, the user may desire a discovery experience, wherein they are exposed to novel content matched to their tastes. Internet radio provides such an experience, however it limited to the delivery of music files. Limited discovery functions are enabled in prior art visual content delivery systems, for example in the form of links to suggested content that are presented to the user based on the user's past viewing history. However, such platforms are browser platforms and do not provide a quick, clean, metered, and unobtrusive viewing experience.

Accordingly, there is a need in the art for novel methods of accessing content, delivering content, and for systems to effectively deliver media files to users in a metered, ephemeral presentation.

SUMMARY OF THE INVENTION

Provided herein are novel systems and methods of digital content delivery designed to be easy, instant, and minimally disruptive. The novel systems and methods of the invention provide the user with a quick shot of content, and then return the user to their previous activity on their device.

BRIEF DESCRIPTION OF THE FIGURES

FIG. 1 is a flowchart which depicts an exemplary embodiment of the invention wherein clip files are downloaded and stored prior to playback.

FIG. 2 is a flowchart which depicts an exemplary embodiment of the invention wherein clip files are streamed to the user's device sequentially.

FIG. 3 is a flowchart which depicts an exemplary embodiment of the invention wherein a playlist comprising links to clip file sources is delivered to the device, and in response to a playback command, the next in line link is accessed and the clip file is retrieved from the source.

FIG. 4. is a flowchart which depicts an exemplar embodiment of the invention on a device which does not support full multitasking, such as a mobile device.

FIG. 5 is a flowchart which depicts an exemplary embodiment of the invention implemented on a smart TV.

FIGS. 6A, 6B, and 6C depict part of the process of the invention wherein a media player application is initiated and overlaid over other open windows. FIG. 6A depicts a simulated screenshot of the screen 601 display of a configured device, wherein an application, in this example, a word processing application, is the on-top application and is displayed in a window 602. Another application window 603, in this example, a spreadsheet, is not the on-top window, and is displayed under the on-top window. At 2:13 PM, the user makes a playback initiation command. FIG. 6B depicts the playback of a clip, in a video player window 604 which overlays all other content displayed on the screen 601. At 2:15, clip playback is completed and the video player window closes. FIG. 6C depicts the screen display 601 after completion of the video clip and closing of the video player window, with the previous window order restored, with application window 602 on-top.

DETAILED DESCRIPTION OF THE INVENTION

Figure 6A:
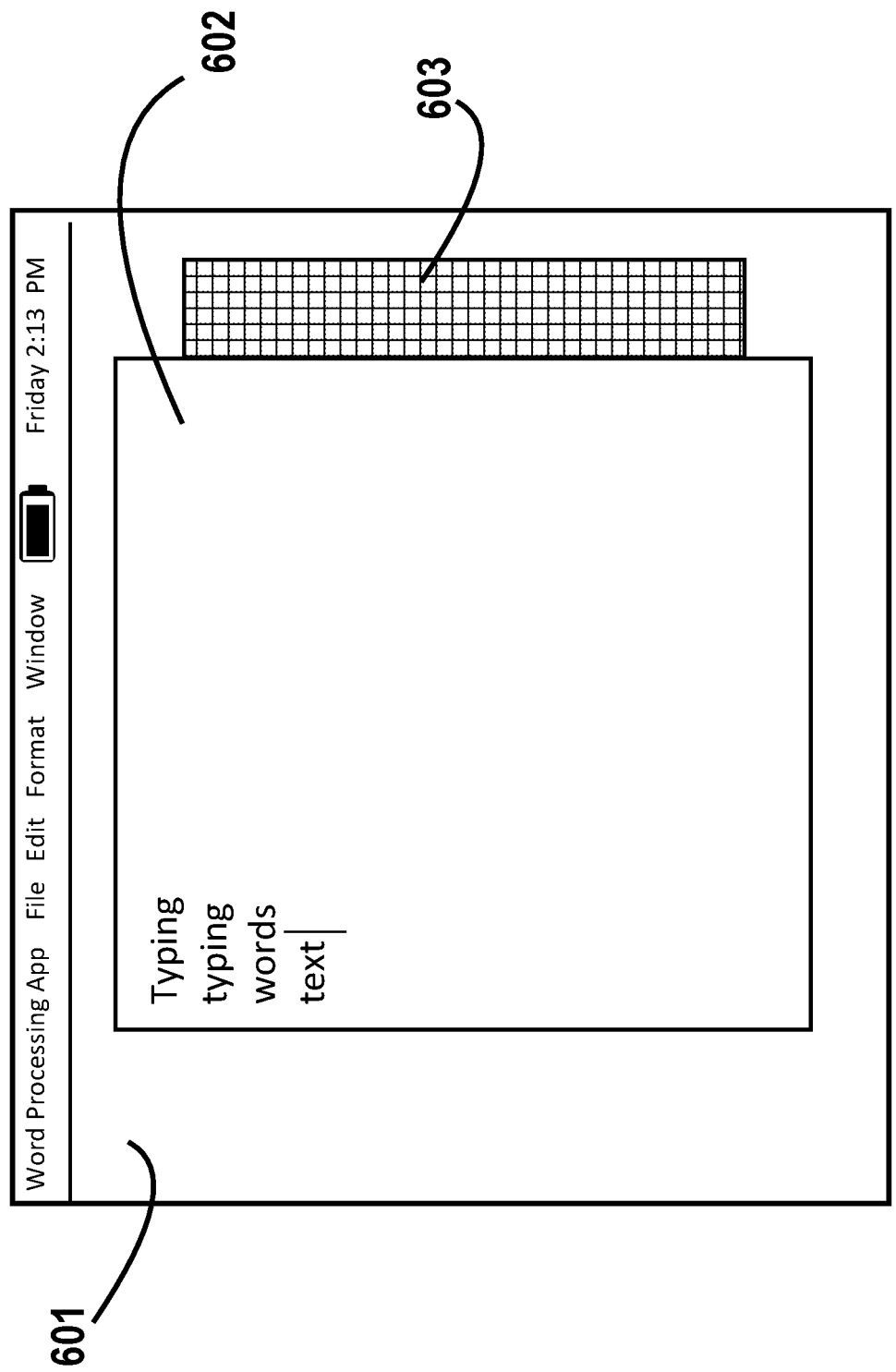
FIGS. 6A, 6B, and 6C.
Figure 6B:
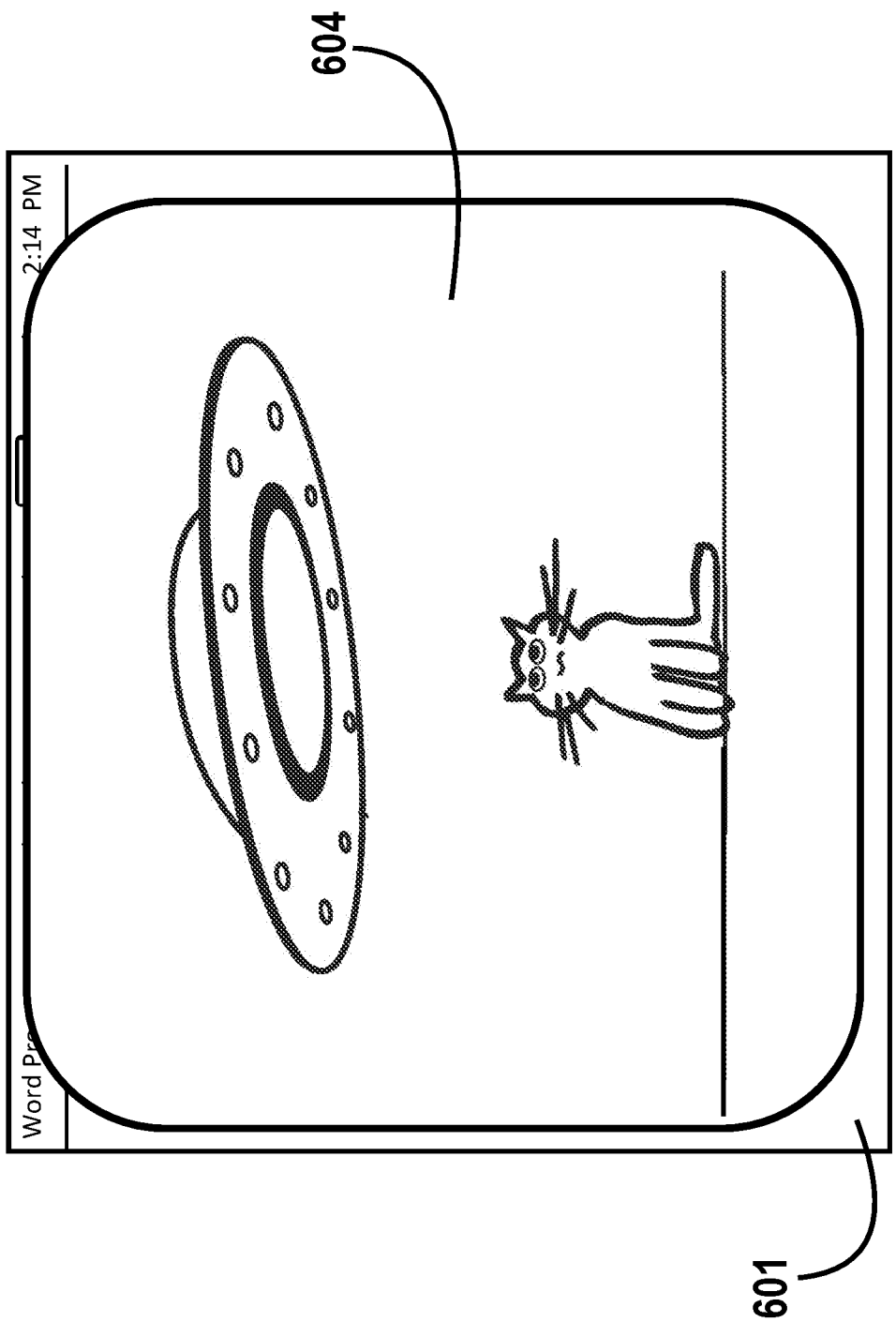
Figure 6C:
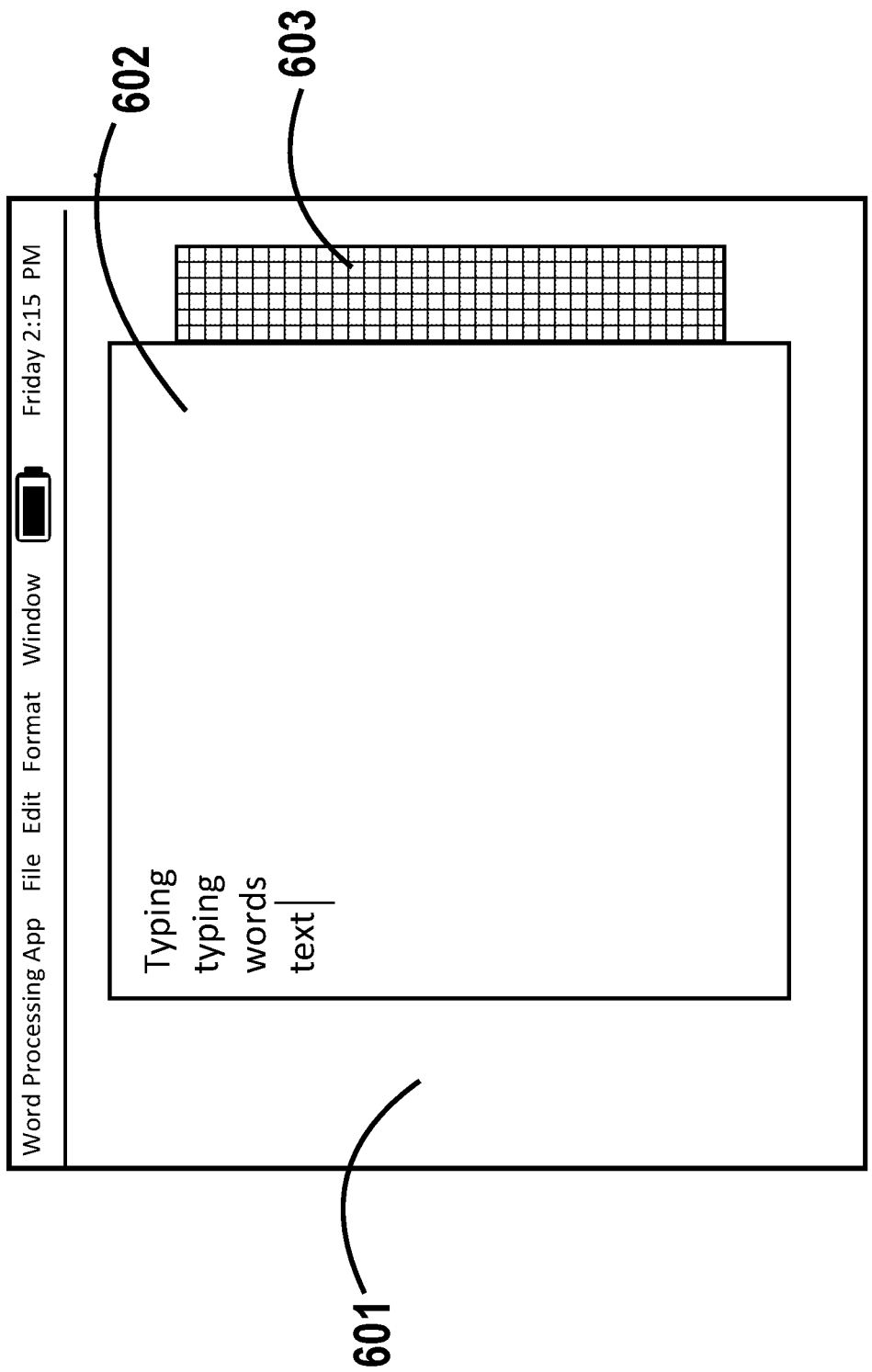

Provided herein is a novel system for presenting the user of a device with a short media presentation, such as a video clip. The purpose of the system is to provide the device user with an instant and ephemeral snippet of entertaining media, in a metered presentation controlled by the user. The system is minimally disruptive in that the user can summon a video clip or other media content with a simple input, whereupon a clip is instantly played for the user. Upon reaching the end of the clip, the media player window self-closes and returns the user's device to the exact state it was in prior to summoning the clip. In this way, a user can enjoy a short, entertaining pause without substantially interrupting their previous activity on the device.

The system is also fully interactive, allowing users, if they choose, to interact with content, access related content, and share content with other users. The system is readily integrated with other social media platforms. The system further comprises various revenue-generating aspects.

The System

The various embodiments of the invention comprise methods of presenting content, especially video content, to a user. The many functions of the invention are performed by a system, which, for convenience, will be referred to herein as the "System." It will be understood that System elements described herein are exemplary and the scope of the invention is not limited to any specific combination of elements comprising a single system.

The System comprises physical elements, such as computers, servers, network connections, video screens, mobile devices, keyboards, touchscreens, etc. The System also comprises software elements, including instructions and code for performing the various operations of the invention, such software residing on non-transitory computer readable media. The system also includes network elements, including wireless networks, wired networks, the internet, local networks, and others. The System further comprises content, including audio and video content. The System encompasses physical manifestations of the software and content associated data, including non-transitory computer readable storage media, such as disks, hard drives, flash drives, and other data storage mechanisms known in the art.

The invention is understood to encompass various software and other operations performed on and by hardware elements. An exemplary device is an Apple iPhone running the Apple iOS operating system or a PC running the Microsoft Windows 10 operating system. Exemplary servers may be based on general-purpose processors, such as the Pentium XENON™, etc., and may also include network processors such as Intel's XP-1200 and may run on any operating system, such as Linux. Exemplary smart TV's include the SMART TV™ by LG, running the webOS operating system, and the M-SERIES TV™ by Vizio, running a proprietary operating system. The networks utilized by the invention may include local wireless networks, cellular data networks, and the internet.

The System is not limited to any particular types of hardware, software, network configurations, or associated elements, and the invention encompasses any electronic means of performing the operations and actions described herein.

It will be understood that the System may comprise multiple components which reside in different places. For example, the System may comprise an application which resides and operates on a user's device. The application may comprise a stand-alone application, or a plug-in, such as plug-in for a web browser. The System may further comprise components external to the user's device, such as a database which stores the content that is provided to the user's device, a television set or set-top box which receives commands from the user device, and other components outside of a user's device.

Devices.

The System provides content to that can be viewed, read, listened to, or otherwise experienced using a device. A device refers to any electronic apparatus or system which can play media clips, especially devices having a screen and/or speakers. Exemplary devices of the invention include laptop computers, desktop computers, smartphones, tablet or pad computers, music players, stereos, televisions, wearable hardware, projectors, etc.

In order to enable the use of the methods and systems of the invention, the user must be utilizing a configured device. A configured device, as referred to herein, means a device capable of receiving a clip from a remote source (for example, a System server) and playing the clip upon receipt of a playback initiation command. The device set-up process comprises the loading of one or more applications that carry out the functions described herein on the device, the one or more applications being compatible with the operating system of the device. Such one or more applications, for convenience, will be referred to as "a System application," although it will be understood by one of skill in the art that that multiple applications may be utilized in combination to effect the desired functions. The System application may comprise a stand-alone software program. The System application may comprise a browser or media player extension or plug-in which operates with a browser or media player program residing on the device.

Upon loading of the System application, various steps may occur. One step may comprise an assessment of device capabilities, for example, an assessment of device make and model, device hardware present, device media players present, device memory capacity, or device network capabilities and speed. This device information may be transmitted to remote System servers and stored as part of the user's profile information, such that the System's content manager functions will be enabled to send clips comprising file formats compatible with the hardware, software, and/or network capabilities of the device. Another configuration step may comprise the running of scripts or the installation of application elements, plug-ins and extensions that enable the clip playback functions described herein. Another configuration step may comprise the reprogramming of the device to enable keystroke inputs or touchscreen/mousepad inputs to be received and recognized as System commands. Another configuration step may comprise the solicitation of user permissions by the device's applications and functions which comprise the operating system to grant System functions priority during playback (e.g. on-top window status or exclusive run of the audio outputs).

Clips

The System provides the user with content. The content delivered by the System may encompass any subject matter. Exemplary categories of content subject matter include movie clips, movie trailers, music video clips, documentary clips, clips from television programs, educational material, sports highlights, artistic photographs, animal videos, "trending" subject matter, retro and vintage content, newscasts, political content, standup or sketch comedy, interviews, and weather reports.

Content provided by the System is presented in discreet units, called "clips." A clip comprises a media file, which encodes a video, image, audio track, or other content. Clips may comprise video files in any format for example, MP4-based Ala, H.264 MONT, MPEG-2, MP4, and OGG. Clips may also comprise images, for example photographs, drawings, or other static graphics, in any image file format, for example, PNG, JPEG, JPG, etc. Clips may further comprise audio files, in any format (e.g. MP3, MP4, etc). Clips may comprise animations, in any format (e.g. GIF, etc).

Clips may comprise media files encoding social media posts retrieved from a social network, e.g. a FACEBOOK™ post, a TWITTER™ message, an INSTAGRAM™ photograph, or a TUMBLR™ blog post. In such embodiments, the system utilizes appropriate API's to access posts from the third party social media site or entity, using permissions provided by the user and the third party site or entity. The social media post files may be accessed as is, or may be converted to a System-compatible format. Clip renderings of a social media post may be interactive, e.g. having links and capable of being clicked and effecting functions as they would in their native environment.

Clips may also comprise interactive media files, including games, quizzes, puzzles, video teleconferences, and other media experiences which allow the user to interact with the content, for example using a mouse, keyboard, or touchscreen to make inputs. Exemplary games include card games, video games, sudoku, math, or word games, and video renditions of board games.

In addition to the media file element of a clip, each clip further comprises a clip descriptor. The clip descriptor is data about the media file and can include information such as: the subject matter content of the clip; keywords which describe the clip; the clip file format, size, and length; the clip file location; the feedback which the clip has received (e.g. how many likes and how many dislikes it has received); and other information that describes the content, format, popularity, and other aspects of the clip. Clips can be assigned various category tags, for example, for example, "adult content," "not suitable for work," "family friendly," etc.

System Library

In some embodiments, the System comprises what will be termed a "System library," which is a collection of clip descriptors. The descriptors may describe media files which are stored in the System library. For example, the System library may comprise a storage means, such as a server or cloud server, where clip media files are stored. Alternatively, the descriptors may describe media files which are not stored by the elements of the System, but which are instead accessed from third party sources. In either case, each clip descriptor contains file location data which identifies where the associated media file (or files, if multiple versions of a file are stored, as described below) can be found, for example, a System library storage location or a link (network address, URL, etc.) to a third party file source.

In one embodiment, the clips media files are added to, e.g. uploaded, to the System library from a plurality of content providers. A content provider is any third party person or entity which supplies clips to the System. Such addition of clips to the System library may be managed by a "library manager." The library manager is set of automated and/or manual actions that combine to regulate, classify, and store clips within the System library. In one embodiment, the content providers upload content to the system via a library manager comprising a website, application, or other portal. The library manager can set any number of rules or specifications for uploading content. The library manager can specify the subject matter, duration of the clip, file format, or any other aspect of the content to be uploaded to the System library. Contractual arrangements, waivers, disclaimers, terms of use, payment arrangements, and other legal matters can be imposed upon content providers by the library manger as a condition of upload. Clips may be classified by content providers at the time of upload. For example, a content provider uploading a clip to the System library may be presented with a menu of categories and may be asked to select a category or categories relevant to the subject matter of the clip, e.g. "cats," "baseball," or "nature". Likewise, the content provider may be asked to enter keywords or tags to the clip to aid in describing its content.

Automated tools can be used to assess that content is in compliance with System requirements. For example, in one embodiment, automated tools and filters are utilized to analyze uploaded files as they are uploaded or afterwards, and can block the downloading or effect the deletion of files that do not comply with System requirements. For example, antivirus tools can scan incoming files for viruses, malware, and other undesirable data. Automated tools that employ pattern recognition algorithms and the like can be used to identify and/or exclude detected undesirable content, including copyrighted material being uploaded without permission.

In one implementation, the screening process for incoming content is at least partially manual. For example, a pending clip can be reviewed by one or more persons that can determine if the subject matter is objectionable or offensive, is accurately classified, is sufficiently entertaining, etc. Review can be by System personnel, or persons working on behalf of the System, such as a panel of users. Clips can be rejected by the reviewer(s) if found not compliant with System requirements, and can be added to the System library by the reviewer(s) if approved.

Clips that have been approved for inclusion in the System library may be converted to and stored as one or more file formats utilized by the System for delivery to users, for example compressed, encoded video files. Each clip file in the System Library may be converted to and stored in multiple files of different formats or file sizes. For example, for any given clip, different versions of the clip comprising different file types (MP4, AVI, etc.) can be stored in order to serve devices having diverse player capacities. Likewise, files of differing resolution (e.g. larger high resolution video files vs. smaller low resolution video files) may be stored (e.g. 640×480 or HD 1080 video files, etc.). Subsequently, when a particular clip is selected for delivery to a user's device, an appropriate version of the clip file can be delivered, for example based on the device's player capabilities and/or network capacity (for example, as monitored and communicated to the content manager by System functions residing on the user's device). For example, smaller, lower resolution files can be transmitted if network bandwidth is limited.

The library manager may comprise a quality control function to suspend or eliminate clips from the System library if they do not meet certain criteria. For example, if a threshold number of users flag a clip as offensive, misclassified, or otherwise objectionable, the flagged clip may automatically be removed from circulation, or may be placed in a hold status wherein it is not circulated, pending manual review by System reviewers. In a related embodiment, the library manager may be configured to remove clips from circulation if they receive a designated threshold number of "dislikes," or do not attain a designated threshold of likes from users. In some embodiments, new content is provided only to a subset of users or test panel and is subsequently more widely distributed once it has met certain quality control criteria.

In addition to clips provided by content providers and stored by the System, the System library may also comprise clip descriptors associated with third party media files. In one embodiment, third party content is identified in an automated process. For example, a "crawler" or like function, as known in the art, may be used to search the internet or other network for accessible third party clip media files that meet specified search criteria, for example keywords associated with popular content. In another embodiment, feeds from various content sources are monitored by the System library to identify third party content. When accessible and compatible clips are detected, a clip descriptor is created for the content which describes what it is and where it may be accessed.

Playlist Generation

The System may comprise a "content manager" element that performs a playlist generation function for each user. The playlist specifies, for each user, the clips that are to be played for that user, and in what order. The content manager is a rule-based tool which selects a playlist based on playlist rules, i.e. clip selection criteria. Clip descriptor data from the System library (or other sources) is queried, searched, or analyzed against user preferences to identify clips that the user will likely enjoy. User viewing history is also taken into account, and playlist rules are applied that specify what types of content should be selected, the frequency with which certain clips or certain types of content are played, and other System or user-specified criteria.

The content manager can utilize any technology known in the art for the generation of playlists, e.g. "smart playlists," including any number of decision making tools such as rule and content hierarchies, random selection, logic based methods, and any other operations to known in the art for the selection of items for a customized playlist matched to an individual's preferences.

In one embodiment, the user has an account on the System, e.g. a password protected account with a unique username, which provides the user with a long term presence on the System, wherein the user's viewing history, feedback, preferences, and other information can be retained and used to guide playlist generation. Preferences can be input by the user at the time of account set up and on an ongoing basis.

In one embodiment, the System portal, as described below, comprises a page or site wherein the user can input content preferences. In one embodiment, a preference menu is displayed for the user, wherein the user may designate the types of content they would like to see. Drop-down menus, and nested pages may be used query the user's preferred content types with high granularity. For example, a user may specify that they would like to see sports clips. A menu of different sports can then be presented. Upon selection of a sport, for example, basketball, another menu can be presented that allows the user to specify which league, teams, player, or years the user is interested in, for example allowing the user to specify "1980's Boston Celtics."

Clips may be classified and grouped into channels, comprising collections of content which is related to a specific theme or subject matter, for example "the cat channel," or "the football channel," or which is provided from a common source such as a broadcast network (e.g. BBC™, CNN™). In specifying preferences, users may subscribe to a channel in order to receive content therefrom.

Additionally, a user may input their preferences as to the relative proportions or frequency with which they would like elected content types to be presented. For example, slider bars or radio buttons may be presented to the user which allow the user to assign their desired frequency of viewing for each category of subject matter. For example, a user may specify frequencies such as "rarely," "occasionally," and "often" to a particular category of content. A user can also be presented with the option to specify other parameters that define a playlist, for example, they could specify how often they would like clips to be repeated, the desired average duration of clips presented (e.g. short vs. long), etc.

User preferences may also be derived by tracking feedback given by the user to clips that have been viewed, for example, specific feedback inputs such as "like" and "dislike." Clip descriptor data from liked or disliked clips which describes clip subject matter can be used to guide future clip selection. User personal data may also be utilized to infer or predict user preferences. For example, user demographic information, such as user biographical information provided voluntarily by the user, or sourced from third party data collectors, may be analyzed against any number of predictive tools or models to define content that the user is likely to enjoy. In one embodiment, the user may grant permission for the System to access a user profile on a social media site, e.g. a FACEBOOK™ profile, and the data therein can be analyzed in an automated fashion to determine the types of material a user will likely enjoy.

Additionally, user preferences may include device-specific, geographical, or temporal rules for the selection of clips. For example, if a specific device is used in a work setting, for example a desktop computer, a user may specify that such device not summon clips which are considered "not suitable for work." Likewise, mobile devices can be configured to avoid playback of not suitable for work content when geo-location means (e.g. GPS) detects that the device is at a work place, or is in a public setting outside the user's home. Similarly, users can specify that specific content be displayed only at certain times of the day.

Users may grant permission for the System to draw playlist items from the user's social media accounts. With user permissions, social media platform permissions, and appropriate API's, social media posts can be accessed directly or converted to a specified clip format and then displayed. The user may specify that random posts can be accessed or may specify criteria for selection of social media posts, for example, limiting the selected posts to those that have achieved certain levels of viewer approval (e.g. number of views or number of likes), limiting selected posts to those including certain keywords, or limiting the selected posts to those from selected friends or sources.

In one embodiment, the user may select specific clips for the playlist. For example, the user may select clips from a menu listing files available at a centralized library, e.g. a System library. The user may also select items from a personal library of media files, or media files from third party sources to which the user has permissions to access. For example, the user may specify that photos or videos from an iPHOTO™ or PICASA™ library be accessed as potential playlist items. Such selection may be random or may be according to specified criteria (e.g. the user may direct the System to select favorite photos or photos featuring favorite people or places).

Playlist rules include System guidelines set by System administrators that specify the types of content and the relative proportions of different types of content that will be presented to the user. For example, the System guidelines may call for a designated ratio of sponsored or commercial content to be played for the user, e.g. one of every ten or twenty clips will be promoted content. System guidelines can also specify how often liked or favorite clips are repeated, and can assign frequency of play status to clips, for example favoring the selection of newer clips for a user's playlist and phasing out the playback of older clips.

Playlist generation is an ongoing process. In one embodiment, the playlist is constantly updated, with a new item added after each next-in-line item has been played. In another embodiment, the playlist is periodically updated to set number of clips (e.g. 5, 10, 50 clips, etc), for example being updated when all items on the previous playlist have been played or when a certain number of unplayed clips on the list has been reached. In one embodiment, where clips are streamed on demand, the playlist may be generated on demand, with items selected sequentially as each clip request is received.

The functions of the content manager may be performed using any combination of hardware or software, for example comprising software which resides in whole or in part on the user's device, i.e. as an application, and/or the content manager may reside in whole or in part on the System's servers which are remote from the user's device.

Accessing Clips

Ultimately, the items selected for the playlist must be made accessible to a media player residing on the user's device. This may be implemented in various ways. For example, content may be delivered to a device in a "streaming" process, wherein clip file data is delivered to a buffer cache (for example, the cache being an element of a media player) or other temporary memory storage, wherein the data comprising the clip is deleted or overwritten after the content it encodes has been played for the user. Alternatively, clip file data may be downloaded and stored in a non-transient or persistent storage location, and may be accessed at a later time. Delivery to the user's device may encompass any technology known in the art for delivering media files to a device for playback by a player, including the use of streaming servers, unicast or multicast streaming, multibitrate encoding schemes, progressive download systems, etc. The content may be provided to the user's device by means of streaming media servers and associated streaming media protocols such as RTP, RTSP, and RTCP.

Clips delivered to a user's device may be transmitted in a compressed and/or encrypted form, as known in the art, with compatible decompression and/or decryption tools used by the receiving device. Clips delivered to a content cache may be decoded automatically upon receipt in the cache, or may be stored in an encoded state and decoded by the media player at the time playback is initiated.

Three exemplary configurations for delivering/accessing content are described below.

Playback of Previously Downloaded Clips.

In a first embodiment, the clips selected for the playlist by the content manager are downloaded to the user's device and stored prior to playback. For example, downloaded content may be stored in a dedicated content cache. A content cache means any memory or data storage hardware or capacity that is located on the user's device (or is readily accessed by the user's device). The content cache, as used herein, may comprise CPU memory or cache memory, as known in the art, which is more readily accessed by the CPU and/or graphics card. In contrast to a buffer cache, which is used with streamed media, the content in the content cache may be retained for long term storage, if desired. The content cache advantageously provides direct access to complete media files for immediate, uninterrupted playback. In contrast with clips that are streamed to a media player, cached content does not suffer from potential "hiccups" and other delays inherent in loading and playing streaming media in real time due to slow or intermittent network connections. The content cache may have any capacity, and in some embodiments large quantities of content may stored in the content cache, prior to their playback, such that several preloaded media files are on hand for immediate playback without loading delays. In one embodiment, the content cache is kept at a predetermined capacity, e.g. a number of megabytes or gigabytes, or a specific number of files (e.g. 5, ten, or twenty clip files). The cache can be maintained at or near capacity by automated downloading of clips, for example in a background or trickled downloading scheme, e.g. being downloaded at low transfer rates. The System can be configured for paused downloading of content such that filling of the cache is performed when other applications are not accessing the network, in order to avoid interfering with other network traffic. The capacity of the content cache may be set according to the user, or by the System.

In this stored clip implementation, content is accessed as follows. In a first step, the content manager selects one or more clips for the playlist, retrieves the clip files from a clip source (e.g. the System library or a third party source), tags the clips with a numeric tag or like metadata that indicates clip playback order, and downloads the clips to the device. The clips received by the device may be stored in a persistent, non-transient storage location, such as a content cache.

Upon the receipt of a clip playback initiation command, a clip selector function residing on the device will query the clips stored on the device, e.g. in the content cache, and will select the next-in-line clip based on the numeric or other playback order metadata associated with the clip files. For example, the clips may be numbered sequentially according to their order in the playlist and may be tagged as watched or unwatched. The clip selector may be configured to select the unwatched clip having the lowest numeric playback value.

On-Demand Clip Streaming.

In a second embodiment, the clips are streamed to the user's device sequentially as the user initiates playback. In this implementation, when the user inputs a clip playback initiation command, a clip selector function residing on the user's device sends a request for a clip to the remote System servers. The next-in-line clip file, having been determined according to the playlist generated by the content manager, is retrieved by the content manager and is streamed to the media player on the user's device.

Playlist Comprising Links.

In a third embodiment, the content manager generates a playlist comprising links, which list is transmitted to the user's device. Each link comprises a network address or file location, such as a URL, specifying where the clip files may be accessed. Each link has associated playlist order data specifying the order that the linked files are to be played. Clip selector functions residing on the device follow the list in order. When the next-in-line link in the playlist is selected, the device's network capabilities are utilized to access the specified link and the content is retrieved from or streamed from the source specified by the link. The link may be used to access files stored in the System library, or the links may specify content available from third party sources. In some cases, it may be necessary that the target device have a plug-in or player compatible with the 3rd party file owner's streaming protocol.

Variations of the three embodiments described above may be used. In a hybrid implementation, some of the clip files may be downloaded ahead of time and others may be streamed.

Clip Playback

Playback, for purposes of this disclosure, refers to the act of playing or displaying a clip on a user device. The specific operations of "playing a clip" or "clip playback" will depend on the type of media file being displayed.

In the case of video files, playback encompasses the playing of the video (e.g. from beginning to end). In the case of image files, the playback may comprise displaying the image for a short time, for example, the image being presented for 2-10 seconds. Display of images may be accompanied by playing of music or sound effects, and/or may be presented in a short series, i.e. a slideshow, of related images. For the playback of animations, e.g. GIF's, the animation may be looped a certain number of times (e.g. 1-3 times) or may be displayed for a specified duration of time (e.g. 2-10 seconds). In the context of interactive content, e.g. a game or a quiz, playback refers to initiating the interactive content and it can be displayed until the interaction is done (e.g. the game ends, the quiz is completed, etc.) or for a specified period of time.

The playback process involves multiple elements. One element of the playback process is clip selection by the content manager, as described in the previous section. A second element of playback is playback initiation. A third element of playback is player activation and display. A fourth element of playback is playback termination.

Playback Initiation.

In some implementations of the invention, the objective of the system is to provide easy and instant playback of clips for a user. In such instantiations of the invention, facile playback initiation is a critical element, wherein playback is initiated by an easy or minimalist input of the user.

The inputs which may act as playback initiation commands will be determined by the input interfaces available to the user on a given device. Any sensor-based hardware, including hardware devices integral to a device or peripherals in connection with the device (wireless or wired), which can receive, interpret, and discriminate a user-generated action can be used as an input to initiate clip playback. For example, if the device is a desktop computer, the inputs may include a physical keyboard and a mouse. If the device is a laptop computer, the inputs may include a physical keyboard and a mouse pad (a.k.a. touchpad mouse). If the device is a smartphone or tablet, the inputs may include a touchscreen. If the device is a television, the inputs may include a remote control having multiple buttons, optionally operated in connection with a displayed guide or menu. Devices may comprise microphones for the receipt of verbal commands. Additional exemplary inputs include those incorporated into wearable devices, including glasses, bracelets (for example, the APPLE WATCH™ by Apple, and others, which may accept various commands in the form of hand/arm, facial, or body gestures.

In one embodiment, the initiation input comprises selecting a displayed button. A displayed button, as used herein, is an image comprising an icon, drawing, or text, for example a graphic depicting a button, such virtual object being displayed on a graphical user interface (e.g. a screen). The button can be selected by any number of interfaces, for example by positioning the cursor or like selection means over the button and then clicking, tapping, or otherwise indicating selection of the button. This action signals the system to begin playback of the next-in-line clip.

In one embodiment, the displayed button of the invention is configured as a sidebar button. A sidebar button comprises a button which is always visible on the screen, regardless of which application has focus, and which is confined to a peripheral row or column of icons at the top, side, or bottom of the screen. When included in a sidebar, the button is almost always available and readily accessed by the user (unless an application in full screen mode obscures it).

In another embodiment, the displayed button of the invention is configured as a floating button, comprising a button which is displayed in a floating window that is always on top and always visible. Preferred floating buttons are low profile, e.g. being small, semitransparent, and/or being positioned unobtrusively, for example in the corner of the screen. Such unobtrusive buttons floating above other windows may be quickly selected but are minimally disruptive to the user's view and access of other applications.

Displayed buttons may comprise multiple grouped buttons, for example panels comprising two or more buttons, for example arranged in one or more rows, circularly, or elsewise. By grouping multiple input controls in a single region of the screen or a single panel, the user may readily select among different playback modes (e.g. mute vs. full sound) and/or to choose among two or more different content subject matter categories or channels (e.g. specifying a sports clip with one button and a movie clip with a different button). One or more of the displayed buttons may comprise a link, whereupon selection of the button opens a web page or other portal.

In another embodiment, the initiation input of the system comprises a keystroke (a.k.a. a keystroke gesture). A keystroke is the pressing or other input of a specific key from a standard keyboard, or a combination of keyboard inputs (e.g. Control+Alt+8, etc). It will be understood that keyboards include both physical keyboards, for example as used with a desktop or laptop computer, displayed keyboards, and other keyboards such as projected keyboards. The keystroke command can be enabled by assigning a system playback initiation function to a specific key or combination of keys. Hotkeys may similarly be used as initiation inputs. In some embodiments of the invention, the System comprises a module which automatically installs, or aids the user in the installation of hotkeys or keyboard shortcuts to associate such specific keystrokes with System commands, such as a playback initiation command.

In another embodiment, the initiation input of the system comprises a touchscreen gesture. The vocabulary of commonly used touchscreen gestures is currently small, yet touchscreen interfaces are capable of receiving and recognizing a wide range of patterns. For example, in exemplary embodiments of the invention, clip playback is initiated by the user drawing a circle, a square, a letter (for example, an "x"), a logogram or character, a number, or any other distinct or quickly drawn shape or symbol. In one embodiment, different letters are used to summon different types of clips, for example, in an implementation of the invention in the English language, an "s" could summon a sports clip while an "n" could summon a news clip. In one embodiment, the user traces the shape of a circle, representing a virtual button, and then presses or touches the center of the button to activate clip playback. In another embodiment, the user traces a letter specifying a certain category of content and then makes an accessory gesture to initiate clip playback. In another embodiment, the user drums their fingers on the touchscreen or mouse pad (suggestive of boredom or restlessness) and this action initiates playback. Finger drumming can comprise the rapid sequential tapping of the screen with three or four fingers, for example the ring, middle and index fingers or the pinky, ring, middle and index fingers being tapped down onto the touchscreen or mouse pad sequentially, for example from right to left or left to right. The novel touchscreen and mousepad gestures of the invention, including a drawn button and finger drumming, may be applied in contexts beyond the scope of the System, and the invention encompasses the use of such gestures to command computer functions unrelated to the System.

The playback initiation input of the invention may also comprise a gesture or other body movement, as is utilized in the growing number of gesture interfaces, for example the REALSENSE™ or LEAP MOTION™ controllers.

The playback initiation command of the invention may also comprise an audio command. The user may utter a phrase, comprising one or more real words, neologisms, a sung note or phrase, or a tone in order to initiate playback of the next clip.

The types of inputs that may be used to initiate clip playback may be limited by the operational mode of the device. Reference will be made to a device enabling differing degrees of "multitasking." It will be understood that such reference refers to user multitasking, as in the ability of a user to employ multiple applications (or multiple screens from a single application) at the same time. For example, many mobile devices allow limited user multitasking, wherein the user is restricted in the number of active windows or applications that can be utilized simultaneously. For example, in iOS, the user is typically enabled to use and to view the active screen of only a single application at a time. For example, in a full user multitasking computing mode, such as is commonly employed in desktop and laptop computers, the use of inputs such as selecting a floating button or a sidebar button, or making a keystroke combination is readily implemented. In devices with limited multitasking abilities, such as typical smartphones and tablets, the use of floating buttons and keystroke combinations is not readily implemented due to the lack of a displayed sidebar, the lack of an ability to display a floating button, and because a fully functional keyboard with control keys is not typically displayed or available. Utilizing a touchscreen input to initiate playback is especially advantageous for such devices, as the user can initiate System application activation and clip playback without the normal actions required for switching between apps. For example, an up-swipe or right swipe, or a custom finger motion can be utilized as commands to close or suspend the current app and command a System application to trigger clip. Alternatively, the user can depress the "home button," scroll through an applications menu comprising icons for apps, and select an icon that activates System playback of a clip, and upon termination of the clip, the player window can close and return the user to the app menu page.

Clip Playback.

Once a playback initiation command has been received, the next-in-line clip is played back for the user by a media player. A media player, as used herein is a program or other computing means which displays or plays a media clip. Exemplary players include QUICKTIME™ player, WINDOWS MEDIA PLAYER™, B2 Player 2.66, POTPLAYER™, DIVX™ Player, GOM™ Media Player, etc. The media player may be stand-alone, or may be embedded in another application, such as web browser.

The invention is not limited to any specific player or format. In general, a desirable feature of the system is speed, wherein playback commences as quickly as possible, with minimal lag for warm-up of the player application, loading of media files to the player, and initiation of display (and/or audio). Accordingly, preferred players will be fast to access files, decode them if streamed, and display them for the user.

Prior to playback, the player will be in a quiescent state. A quiescent state means that the player window is not visible, or if visible, is inconspicuous and does not interfere with the user's view of their open applications. The player may be quiescent in any number of ways. In one embodiment, the player application is not opened until playback is initiated, and upon receipt of the playback initiation input, the player application opens and the next-in-line clip is played. In an alternative embodiment, the player application is open during the quiescent state, but no window is opened until a playback initiation command is received, whereupon a window opens and plays the next-in-line clip. In another embodiment, a player window is open but remains hidden (not displayed) until the receipt of the initiation command, whereupon the hidden player window is unhidden and the clip is played. In one version of this implementation, multiple player windows, e.g. 2, 3, 4, or five windows or more, are active but hidden, such that a series of clips can be played back-to-back in active windows which are sequentially revealed (unhidden) as playback of each clip in the playlist is initiated. In one embodiment, the player window is open but is kept behind other open windows by the window manager until playback is initiated.

In one embodiment, the player is an embedded player in a web browser. Upon receipt of an playback initiation command, a new browser tab or window is opened (or a hidden browser tab or window in which the file has been buffered is unhidden), and the newly opened or unhidden tab or window is brought to the top of the window order, whereupon the clip file is played by the embedded player.

When activated for playback, the player window will take the form of an active and on-top window which overlays all other windows on the screen. The sizing of the window may vary, for example taking up a portion of the screen, or taking up the full screen. For mobile devices, such a smartphones, a full screen, or near full screen playback window may be preferred, due to the small screen size. For devices with larger screens, a less-than-full size playback window may be preferred, such that windows from other applications remain partially in view. In one embodiment, a picture-in-picture display may be shown, with the clip being the primary display and a muted, small or thumbnail version of the overlaid content being displayed so the user can monitor their overlaid window(s). Playback window size may be determined by the System, may be adjusted in user preferences, or may be adjusted by controls displayed on the playback window.

In many implementations of the System, a key feature is that the playback window will be "on top" when a clip is played, so that the clip can be viewed without interference from other applications. Always-on-top status can be implemented by any number of window manager functions or z-order priority configurations known in the art. In some embodiments, the System application residing on the user's device will enable the user to enter system administrator permissions to the device functions and applications which control windowing and allocation of system resources of the device at the time of setup such that subsequent clip playback is given priority over all other applications, e.g. bypassing the CPU to graphics card chain, etc.

Window manager functions may be configured such that player windows are on top, while another application, for example, the on-top application at the time playback was initiated, retains focus. In other words, in some modes, the user may continue to operate the previous on-top application, e.g. make keyboard or mouse selection inputs, while the clip is playing.

The playback process may vary by device. For example, the playback process will be different for machines that perform true multitasking versus those that perform simulated or partial multitasking, or no multitasking. For example with respect to devices that have full multitasking abilities, such as desktop machines and laptop machines, the player window may remain active but hidden and, upon user initiation of clip playback, can then be displayed on top of other applications running in the background. In the context of mobile devices, such multitasking may not be enabled due to limitations on computational bandwidth. In such environments, the running of multiple apps requires engaging the application switcher functions of the device. In such a setting, a user initiation of clip playback (e.g. a touchscreen input) will result in generation of a command to the device's windowing applications and functions to switch applications from the current application to the System application. For example, the device's application switcher, upon receiving a playback initiation command, can save data and settings in the current application, and then close or suspend the current application in favor of the System application or media player application which is playing the next-in-line clip. Upon termination of clip playback, the app switcher closes the player application and switches back to the previously running app, restoring the session to its previous state using saved settings.

After playback, stored clip files and items on a link list can be tagged as watched, or may be deleted.

Audio.

In some implementations of the invention, the System application configures the audio manager of the device and gives clip playback the highest priority access to speakers or other outputs. The audio manager may be configured to cause other applications to be fully muted or reduced in volume during clip playback. In this way, audio from background applications will not interfere with the enjoyment of the clip. Such configurations can be enabled by configuring the audio manager to give the System priority and/or exclusive access to the sound card during clip playback.

In an alternative embodiment, the clip itself may be muted, or may comprise a clip with no sound, such that other applications with an audio component are not interfered with by clip playback.

Framing, Logos, and Intro and Exit Effects.

The clips may be delivered in a consistent visual style. For example, a frame, logo, watermark, or other visual component may surround or be superimposed upon images or videos during playback. In some embodiments, the underlying screen is dimmed or blurred immediately prior to clip playback to remove visual distraction, and brightens or returns to focus again upon completion of clip playback. Upon clip termination, a logo may be displayed and/or a sound effect may be played (e.g. a jingle). These effects create or conform to a distinct "look" for the System's presentation and branding.

Playback Modes.

In one embodiment, the system comprises a variety of playback modes. Playback mode variables may include the size of the playback window (full screen vs. partial). Playback modes may also be defined by the audio status of the playback. For example, a priority audio setting would mute all other applications and give the System player's audio track exclusive run of the device audio output. A mixed audio setting would play back the clip's audio while other applications' audio outputs are also played. A mute audio setting would play clips with no audio track or would mute clips that had an audio track. Upon selection of a mute audio setting, the system may optionally be configured to select clips that have no audio component or where the audio component is not central to the enjoyment of the clip. Additionally, selection of a mute audio setting for playback can automatically activate closed captioning, such that subtitles or captioning are displayed with the video image. Mute playback modes may be selected by users when they are on the phone or otherwise want to watch a clip without sound.

In an alternative implementation, the System can be used in a continuous play mode. For example, in this mode, the user may initiate clip playback, which will result in a continuous series of clips being played until the user actively terminates playback (e.g. by selecting a "close window" icon, moving a mouse, tapping a mousepad or touchscreen, hitting any key, etc.), upon such termination command being entered, the player window is closed and the user's device is returned to its previous state.

In one mode, the user is presented not with a clip but with a menu of options. For example, access to a plurality of clips may be offered. For example, thumbnail images (either static or animated) corresponding to numerous clips may be displayed, with or without subtitles or other text describing the clips. The thumbnail images may be clickable or otherwise selectable, and when selected, will initiate playback of the selected clip. For example, four, six, eight, or ten thumbnails could be displayed, giving the user a variety to choose from and thus more control over their playlist. In one embodiment, a scrolling series or "river" of thumbnails, e.g. passing top-to-bottom, left-to-right, etc. across the window or screen, is presented to the user. User selection of a thumbnail results in playback of the clip associated with the thumbnail.

In one mode, there is a single, master playlist that is utilized among the multiple devices that a specific User might utilize to accesses the System. In such embodiments, the System's content manager functions keep track of the clips viewed by the user and send instructions that command each device retrieve and playback of clips in accordance with the established order of clips in the master, pan-device playlist. In this way, the series of clips viewed by the user is the same, regardless of which device is utilized to view a clip.

Where multiple playback modes are available, the playback mode for a clip can be selected by the use of different initiation inputs. For example, displayed buttons for different playback modes may be simultaneously presented, for example in a panel or bar, and the user's selection of the playback mode will initiate playback at the settings associated with that mode. If the initiation input is a keyboard input, the various playback modes may be initiated by the use of different hotkeys or keystroke shortcuts. Likewise, if the initiation input is a touchscreen gesture, different gestures can be used to initiate clip playback in different modes.

User Inputs.

During clip playback, the user may be provided with means for making various inputs. For example, displayed buttons can be displayed in or with the player window. Likewise, keyboard inputs, touchscreen inputs, or other inputs may be used to provide inputs during playback. Exemplary inputs include adjusting volume, leaving feedback, terminating clip playback, or "nexting" the clip. For example, inputs for liking or disliking the clip (e.g. thumbs up and thumbs down buttons) may be provided as displayed buttons during playback of the clip. When the user provides such feedback, these inputs may be recorded by the system as user preference data to guide future clip selection in playlist generation functions. In some embodiments, receipt of a dislike input initiates clip playback termination. In some embodiments, a dislike input initiates a nexting function, as described below. In some embodiments, a "close window" icon is displayed as part of the player window such that the user can terminate clip playback. Additional exemplary inputs that can be made during clip playback include a command to be taken to a System portal location, such as the user's home page, the user's clip log, or a clip page associated with the clip being played back.

Playback Termination.

Playback termination can take two forms— clip completion or user termination. Clip completion means that playback of the clip has been completed, i.e. the entire length of the clip was viewed or listened to and the clip is over. For example, a video clip is over when its last frame has been displayed. For other types of clips, for example, clips comprising static images or looping GIF files, wherein there is no discreet endpoint to the content, a duration of playback may be designated (either by the user in their preferences, or by the System) such that playback is completed the end of the designated timeframe (e.g. 2, 5, 10, seconds, etc.), whereupon the player window closes. For interactive content such as a game or quizzes, clip completion may be defined as the time that the game or quiz is completed.

User termination means any termination of clip playback initiated by the user. User termination may be by numerous means. In one embodiment, a specific termination input is utilized, for example selection of a displayed termination button, a keyboard input, a touchpad or touchscreen input, a gesture, a voice command, or a remote control key. In another embodiment, clip termination is in a "hair trigger" configuration, meaning that playback is terminated immediately upon any input by the user, including, for example, a keyboard input (e.g. pressing any key), a touchpad or touchscreen input (e.g. tapping the screen of a mobile device or the mousepad of a laptop computer), moving a mouse, etc. When implemented, this feature advantageously enables instant termination of playback, for example if the clip is not enjoyable to the user.

Regardless of whether the clip termination is the result of clip completion or user termination, in many implementations of the system, it is preferred that the playback window be closed immediately upon playback termination. Accordingly, in some embodiments, the player window is immediately closed or hidden upon completion of the clip or the receipt of a termination command from the user. In most cases, it will be preferred that upon playback termination, the user's computing experience is restored to the exact state it was in prior to initiation of playback, e.g., the application which was on top and had focus at the time of playback initiation is again the application that is on top and in focus, and that the window order or Z-order is as it was prior to clip playback. The purpose of this feature is to provide an ephemeral and unobtrusive media experience for the user, wherein clip playback is a short interruption that ends without requiring any user action and is thus minimally disruptive.

In some embodiments, the file encoding a clip which has just been played is deleted (e.g. made available for writeover). In other embodiments, the file encoding the just-played clip is retained in the content cache or other memory element. In some embodiments, the file is retained in the content cache or other storage for a temporary duration, i.e. a "grace period," such grace period being any duration, for example, 5 minutes, 1 hour, a day, etc. During this period that the clip file is retained, if the clip is "liked" or added to favorites, or some other feedback is left that indicates a repeat viewing of the clip is desired, the associated file can be designated for retention or storage on a longer term basis. On the other hand, if during the duration of the grace period the temporarily retained clip file does not receive user feedback indicating that the user would like to see the clip again, the file can be deleted at the end of the grace period. Retention of files that the user would want to see again can obviate the need for such clip files to be re-downloaded from the System library. If a user dislikes a clip, the associated file can be immediately deleted (e.g. made available for writeover).

Post-Termination Displays.

In some embodiments, subsequent to playback of a clip, a temporary floating button, window, toolbar, or other feature is displayed. Preferably, such floating feature is displayed in a corner or other unobtrusive location, and is of minimal size, and may also be semi-transparent. Such floating feature may comprises one or more displayed icons or buttons that allow the user to make inputs with regards to the just-played clip. For example, the buttons may allow the user to provide feedback on the clip just viewed (e.g. like or dislike), to replay the clip, or may comprise a link, for example a link to a webpage, an application, or a third party site, for example the content provider's site. Alternatively, selection of the link may take the user to a System-hosted landing site such as a clip page, as described herein. Such floating panel may be displayed for a short period of time following playback termination, for example for 3 to 10 seconds following termination of clip playback, after which it disappears from view. For example, if the user has been presented with a video, the lingering feature displayed after such clip has been played may comprise a thumbnail image extracted from the video. The lingering panel may likewise comprise graphics or icons associated with the content provider. For example, if the just-played clip was a media file comprising a social media platform post, the lingering panel may comprise a social media platform's icon.

In some implementations, playback of the current clip is terminated but the playback window does not close, or is closed and then is immediately replaced by a new playback window, in what will be termed a "nexting" function, wherein the user elects to watch another clip. For example, a nexting function is useful if the user does not like the current clip and would like the System to play another clip immediately. Nexting can be initiated by a specific input, e.g. a keyboard or touchpad input dedicated to nexting. Alternatively, the system can be configured such that a standard playback initiation input, if received during playback of a clip, is configured to next the clip by terminating playback of the current clip and initiating playback of the next-in-line clip. In other words, whatever input the user utilized to initiate playback of the current clip is simply repeated to initiate playback of an alternative clip selection.

Smart TV Applications

As of the filing date of this disclosure, so-called "smart television" or "smart TV" seems incipiently poised to become the dominant form of television viewing in the near future. A smart TV, in the broadest sense, is any screen, such as a flat panel television, which is network enabled. Such television systems allow the user to select from a universe of content at their convenience, rather than being tied to the constrained offerings and schedule of broadcast television received by antenna, cable, or satellite. However, despite the great convenience of smart TV, the viewer is often forced to watch commercials or other promotional content. The smart TV implementations of the System allow the user to override commercials or other content with short clips.

Exemplary implementations of smart TV include set top box delivery systems, wherein the user can stream various content to their screen via network connected boxes. Exemplary set top box systems include ROKU™, APPLETV™, AMAZON FIRE TV™, etc. In such systems, the set top box is the hub and receives input orders from a user by means of a remote control or other device. An alternative version of Smart TV utilizes a television set directly connected to the network and running applications residing in the television set's software.

The scope of the invention extends to all forms of smart TV, wherein multiple sources of content are delivered to a television screen. The objective of the System in the Smart TV context is to temporarily override or overlay the content being viewed by the user on the TV screen with a clip provided by the System, for example by temporarily switching the TV input signal to an input from the System. The basic elements of such a system include a clip source, an input controller, and a screen.

The screen may be any display screen, for example a television screen.

The clip source is a collection of clip files. The clip source may be a cached collection of clip files stored on a device which is in connection (e.g. wireless or wired) with the screen, for example a shared wireless network. The clip source may alternatively be an application which is network connected to the screen and to the System servers, and which is able to retrieve clips for streaming or progressive download and relay them to the screen.

The input controller is a device or combination of devices and/or software that receives an initiation command from a user and then effects the playback of a clip on the screen, temporarily overriding or switching away from the current input stream in favor of the clip source. The input controller may comprise a laptop or tablet computer, a smartphone, or a remote control, or any other device or combination of devices which can control the input stream to the television screen and which, upon receipt of an initiation command from the user, can switch the input stream to a clip source for the duration of clip playback, and which can then return the input stream to the previously utilized source when the clip is finished.

In one embodiment, the input controller resides in the television as an application. Upon receipt of a clip playback initiation command, for example from a dedicated button on a remote control, the television switches input streams to a clip source such as a clip cache or network link to a streaming server. The clip is played on the screen and upon receipt of a termination command or completion of the clip, the input controller switches the input stream back to that which was in use prior to clip playback initiation.

In another embodiment, the input controller resides in a mobile device which controls the input stream of the television. The mobile device comprises a clip cache or link to a streaming media server and upon receipt of a command to play a clip on the television, the input stream of the television is temporarily switched to the clip cache or streaming media server for playback of the clip. After playback of the clip is completed, the input controller restores the input stream to the source which was in use prior to receipt of the clip playback command.

A "picture-in-picture" display with the previously displayed channel shown in thumbnail may be employed during clip playback, so the user can monitor the other channel and switch back as desired.

The System has utility as an "ad blocker." In one embodiment, the System is configured to play clips that are the typical duration of a standard television advertisement. For example, in a smart TV context, the clips can be specified as being around 30 seconds in duration, which is the length of the average television commercial. Likewise, a clip or string of clips can be played that is equivalent to the average television commercial break, or "pod," for example about 2 minutes in duration.

System Portal

The System portal is a network-connected resource wherein the user can interact with the System in various ways. The System portal may comprise an application (e.g., an application having network connectivity to the System library and other System databases and servers), or it may comprise a website, or it may comprise any other means of accessing the remote servers of the System.

The System portal may be opened (accessed) by any means, including by selecting a sidebar button, inputting a touchscreen gesture, uttering a verbal command, or keying in a keystroke shortcut. In another embodiment, the System portal may be accessed by a button on a floating panel, for example a floating panel which is always displayed or a floating panel which appears for a short time following the playback of a clip. For example, following the playback of a clip, a lingering, floating panel may be displayed for 2-20 seconds, and this panel may comprise one or more displayed buttons, one of which, upon being selected, accesses the System portal (e.g. web page or application).

Upon being accessed, by any means, the System displays a page to the user, typically a default location such as the user's home page. The System portal may comprise any number of pages, a page being a webpage, application screen, or other displayed "place" or site where certain information is displayed for the user and certain inputs may be made by the user. A page may comprise multiple such webpages, application screens, etc.

One exemplary page of the System portal is a user profile page, wherein the user can input information about themselves and may adjust settings that control their user experience. Another exemplary page is a preferences page, where a user may input preferences about the media content they would like to see. Another exemplary page of the System portal is a messaging page, where users can receive and send messages to other users. Another exemplary page is a user's "wall" or like location wherein the user may post clips that they enjoy or otherwise want to display for followers, subscribers, friends, or other parties that have the user's permission to access their wall.

Another exemplary page is a "clip log," which is a running list of clips that have been played for the user, with each item in the list displayed as one or more pictures (e.g. thumbnail images extracted from the clip) and/or text (e.g. indicating the title or source of the clip). The list of clips may be presented in reverse chronological order of playback (i.e. with the most recently played clip listed first). Separate lists for each device to which clips were delivered and watched on may be displayed. The user may be enabled to select one of the previously viewed clips listed in the clip log (e.g. by selection of a thumbnail image or clip title displayed as part of the list). Upon such selection, the user is then directed to a clip page.

A "clip page," as used herein is a System portal page that is dedicated to a single clip. Various information may be displayed on the clip page, and various inputs may be made by the user with respect to the clip. Exemplary information that can be displayed on a clip page is information about the source of the clip, for example a description of what it contains, for example what movie, television program, or other content it is extracted from, etc. The clip page may also present links to related materials, for example longer (e.g. complete) versions of source material from which the clip was extracted. For example, if the clip is a brief cut from a scene in a movie or television program, a link can be displayed to a site where the remainder of the scene can be viewed, for example the content provider's website or other access point. In some embodiments, the clip page also contains a button or other means to initiate replay of the clip.

The clip page may optionally include various means for leaving feedback. Feedback input can take the form of buttons, for example, thumbs up and thumbs down or other like or dislike buttons. The user may be provided a means to leave comments. The user can optionally be presented with comments posted by others, for example in a discussion board dedicated to the clip.

The clip page may support any number of social media interactions. For example, a user can send a clip to a friend, via the System or another social media outlet. For example, in one embodiment, a user can send clips to another user, wherein the sent clips will enter the other user's pool or potential clips that may be selected for that user's playlist. Clips can be sent with a tag identifying the sender and the sending means may optionally include a text input box for a user to add a comment to the clip for the other user (for example "I thought you might like this," etc). A user can also post a clip to their wall, or to a linked social media account.

The clip page may also comprise links to media providers. A media provider is a service such as an on-demand streaming media service or a site where video files can be rented or purchased for viewing and/or download. Exemplary media providers include NETFLIX™, HULU™, ITUNES™, and others known in the art. In one embodiment, a clip provided by the System is an excerpt from longer source material. For example, the clip may be a scene excerpted from a movie or television program episode. In one embodiment, the clip page for such an excerpt contains displayed links to media providers that can provide the entire source material from which the clip is derived (e.g. the entire movie or the television episode). In one embodiment, the user's selection of such a link takes the user to an account page or other access site of the media provider, where the user may elect to watch the longer source material, purchase it, rent it, or view previews of it. In such case, the System is acting as a matchmaker in presenting the clip to a multitude of users and enticing some of them to view the longer source material.

Business Methods

The various implementations of the System provide opportunities for collection of revenue. In one aspect, clips are provided with accompanying advertising material. Such advertising material may take any form. For example, banner advertisements may be displayed above or below the content of the clip in the playback window. Logos may also be displayed within the content of the clip, for example a network or studio logo associated with the source of the clip. In-line or in-stream advertisements may be played prior to content in clip playback, for example very short advertisements of 1-5 seconds. In one embodiment, the clips themselves are advertisements, and the System may be configured to play a certain percentage of such advertisements as part of a user's playlist. Such advertising material may be targeted to the user based on the user's System profile data, the user's usage/actions history, and user preferences. The System may be compensated for the showing of such advertising materials, for example in standard C.P.M. or like publisher-advertiser transactions. Advertising material may be delivered by ad servers, and such content may be formatted such that it is seamlessly integrated into the playback of the clip, for example by embedded links. Advertising revenue may be split with content providers to incentivize the provision of quality content.

In another embodiment, the System acts a matchmaker between clip providers and System users, e.g. a discovery service. In one embodiment, a content provider is the owner or distributer of a piece of content such as a movie, which will be referred to as the "parent content" (being the parent of the clip). The content provider uploads clip to the System library which such clip is excerpted from the parent content. The System shows the clip to a user and the user may elect to access the clip page associated with such clip. Displayed on such clip page may be links to the content provider's site, or to media providers that can sell, rent, or otherwise provide access to the parent content to the user. If the user selects such links, or take subsequent actions such as downloading the parent content, the System operators can be compensated for such actions, for example in a pay-per-click or pay-per-action scheme, as known in the art.

In another embodiment, the System operators generate revenue by charging third parties for the ability to include their clips in the System library. The System operators may be compensated by such third parties based on the number of users to which the clip is presented, for example in a pay-per-view compensation scheme, e.g. C.P.M. models, of providing sponsored content to users.

In another embodiment, the System comprises subscription services for providing clips to users. For example, in one embodiment, the user must subscribe to a service, channel or other arrangement, providing information or payment in exchange for the provision of clips by the System. For example, the user may be required to subscribe (and/or pay) for access to certain types of content, for example advertisement-free content, premium content, content associated with a specific source or network or specific subject matter (original dramas or football games). In another embodiment, the user may be required to subscribe (and/or pay) in order to view clips in excess of a quota (e.g. ten clips a day, 100 clips a week, etc.). For example, a user may be provided access to a certain number of clips for free, and will have to pay extra fees in order to view more clips than the quota allows.

The scope of the invention encompasses business methods of generating revenue from the playing of clips for users. In one embodiment, the invention comprises a business method of providing advertisers an opportunity to display their advertising material as part of clip playback, for example as a banner advertisement, as an in-line video segment played prior to the content of the clip, or as a clip comprising an advertisement. In another embodiment, the invention comprises a business method of generating revenue by charging content providers to put their clips into the System library, with payment based on the clip being shown to and viewed by a certain number of users. In another embodiment, the invention comprises a business method of generating revenue by providing a clip to a user, providing the user the ability to access a clip page associated with the clip, wherein links to third party access points are displayed on such clip page, and wherein the user's selection of such links, or follow-up actions associated therewith such as downloading the parent content, are compensable events wherein the third party compensates the System operators. In another embodiment, the invention encompasses business methods of selling subscription services to viewers in order for them to view certain numbers or types of content.

In another embodiment, a revenue generating function of the invention is tracking advertisements or other material that has been overridden by clip playback. For example, in some instances, a user visiting a website is required to watch certain content, for example, a pop-over advertisement or an in-line advertisement played before a video clip. Such content is provided by streaming media servers to embedded links in web pages or other formats. In such instances, the user may elect to play a clip using the System in order to watch/experience something while the undesirable advertising content is played through, i.e. the user is utilizing the System as an ad-blocker. The System may be configured to monitor network traffic, web traffic, embedded links, and other content being served to the user at the time of clip playback initiation. This information can be sold by System operators to advertisers, publishers, etc associated with the overridden content, allowing such advertisers or publishers to monitor the true viewership of materials they have paid to deliver to users.

EXAMPLES

Example 1. Playback Process Overview

Reference is made to the flowchart of FIG. 1 for this overview of an exemplary implementation of playback.

In Step 1, a user utilizes a Configured device. A Configured device is a device which is running a System application, the device being configured to receive playback initiation commands and, in response, being capable of playing media clips overlaid on top of other open windows. On a Configured device, the System application is open (active), the user is logged into their System account, and the device is network connected to System servers remote from the device. On a Configured device, the hardware and software capabilities of the device have been assessed by the System, such that compatible media files are sent to the device.

In Step 2, one or more clips are downloaded to the device from System servers and are stored in a memory location on the device comprising a content cache. The downloaded clips were selected from the System Library by Content Manager functions residing on the System servers, such selection being based on user preferences, other user data, and System playlist generation rules. Each clip comprises a media file and playlist order metadata, for example a numeric tag indicating its designated place in the sequential playback order The clips may be processed upon download, for example being decrypted, decoded, decompressed.

In Step 3, the user inputs a command to initiate playback of a media clip, for example by means of a gesture, a mousepad or touchscreen input, a keyboard input, clicking a screen icon, or a voice command. The System application residing on the user's device has been previously configured to recognize the command and translate it into actions which effect clip playback.

In Step 4, a media player window is opened and displays on top of any other open windows. The next-in-line clip in the content cache is identified by assessing playlist order metadata. The selected clip is played in the player window.

In Step 5, the media clip playback is completed when the end of the media clip is reached. The media player window is then automatically closed closed. The windowing applications and functions of the device are commanded to restore the window order that was in place prior to the receipt of the clip playback initiation command, i.e. whatever application was on top at the time the playback initiation command is restored to the top of the window order. Focus, if changed during playback, is restored to the application that had focus prior to receipt of the clip playback initiation command.

Example 2. Streaming Media Playback

In this example, reference is made to the flowchart of FIG. 2. In this example, there is no content cache and clips are not stored on the user's device. Instead, the next-in-line clip, when summoned, is streamed to the user's device. In Step 1, the user is using a Configured device. In Step 2, the user inputs a clip playback initiation command, causing a System application residing on the device to send a request for a clip file to the Content Manager functions residing on remote System servers. In Step 3, the file encoding the next-in-line clip for playback, such file having been previously selected by the Content Manager in a playlist generation process, or being selected upon receipt of the request, is retrieved from the System library and is streamed to the users device, for example by streaming media servers. In Step 4, a media player window on the user's device is opened and overlays all other open windows while the streamed clip file is played. In step 5, upon completion of clip playback, the media player window is closed and the windowing manager functions of the device are commanded to restore the window order that was in place prior to the input of the clip playback initiation command.

Example 3. Linked Content

In this Example, reference is made to the flowchart of FIG. 3. In Step 1, the user is using Configured device. In Step 2, remote System servers generate a playlist in the form of a list of links (e.g. a network address) each link specifying the location of a media file source. The file locations may be on System servers or on third party servers. Each link is associated with playlist order data that specifies the order that the links are to be played. The list of links is transmitted to the user's device. In Step 3, the user inputs a playback initiation command. In Step 4, a System application running on the user's device, in response to the playback initiation command, selects the next-in-line link from the list of links, based on the playlist order data. A network connection is established by the network functions of the device with the network address specified by the link, and the media file is streamed to the user's device. In Step 5, which may occur simultaneously with Step 4, a media player window is opened and is overlaid over all open windows. In Step 6, the media player plays the streamed file until it is completed, then the media player window automatically closes. The window order at the time the playback initiation command was received is restored.

Example 4. Non-Multitasking Environment

In this example, reference is made to the flowchart of FIG. 4. In this example, the user's device is a device that does not support full multitasking. In Step 1, the user is using a Configured device. In Step 2, the user inputs a playback initiation command. In Step 3, the application in use at the time the playback initiation command is received is closed or suspended by the application switcher function of the device, with any data or settings required for restoration of the user's session later being saved. In Step 4, a media player application, or an application with an embedded media player, is opened and is displayed, and the media player application accesses a clip media file from a clip source, for example from a streaming media server or from a content cache. The clip is played on the screen of the device. In Step 5, upon completion of the clip playback, the media player window closes. In Step 6, the application that was in use at the time the playback initiation command was entered is reopened or un-suspended and is restored to the state it was in prior to initiation of clip playback.

Example 5. Smart TV Playback

In this Example, reference is made to the flowchart of FIG. 5. This Example describes an exemplary implementation of the playback process on a smart TV.

In this Example, the user is watching a first channel (i.e. input source) on a smart TV, the smart TV being capable of running a System application. The System application on the smart TV is configured to receive a playback initiation command from a remote control, and upon the receipt of such a command can compel the TV's input selector to temporarily switch the TV screen input channel from the first channel to a second channel in connection with a clip source, for example a streamed clip or a clip stored in a content cache, for example a content cache in the TV's memory.

The playback process is as follows: In Step 1, the user is watching a first channel on the Smart TV. In Step 2, the user selects a button on a remote control to activate clip playback. The remote control can be a dedicated device for controlling the TV's input selector. The remote control may be a traditional remote control, for example, communicating with the TV by a wireless signal (e.g. infrared signal). Alternatively, the remote control may comprise a device, such as a smartphone or tablet computer and the clip playback command may be the selection of a displayed button or a touchscreen gesture. The device comprises an application, wherein the application is configured to send channel input commands to the TV, for example via a common wireless network utilized by both the device and the TV.

In Step 3, in response to the playback initiation input, the operating system applications and control functions of the TV command to the TV's input channel selector to switch the input channel to a channel comprising a clip source. In streaming media embodiments, the clip source may be a streamed clip transmitted from remote servers. In embodiments comprising a content cache, the clips source may be a content cache stored in memory elements of the TV or the controlling device.

In Step 4, the clip is played on the TV screen. Optionally, a feed of the input channel that was being watched previously may be shown concurrently with the clip in a smaller "picture-in-picture" screen In Step 5, upon completion of the clip, the System application residing on the TV commands the TV's input channel switcher to restore the input channel to the input channel that was being watched prior to receipt of the input command.

All patents, patent applications, and publications cited in this specification are herein incorporated by reference in their entirety to the same extent as if each independent patent, patent application, or publication was specifically and individually indicated to be incorporated by reference. The disclosed embodiments are presented for purposes of illustration and not limitation. While the invention has been described with reference to the described embodiments thereof, it will be appreciated by those of skill in the art that modifications can be made to the structure and elements of the invention without departing from the spirit and scope of the invention as a whole.

What is claimed is:

1. A method of playing a media file on a user's device, comprising the following steps,
    a user, wherein the user is using an on-top application, inputs a playback initiation command;
    wherein the playback initiation command is input by the user to request playback of a media file by a quiescent media player application which plays media clips overlaid on top of other open windows in response to a playback initiation command;
    wherein the playback initiation command is selected from the group consisting of selecting a sidebar button, selecting a floating button, making a mousepad or touchscreen gesture, and making a keystroke combination input on a keyboard;
    in response to the initiation command, a quiescent media player application is activated such that a media player window is displayed as the top window on the device's display screen;
    a media file is retrieved from a media file source and is played in the media player window, wherein the media file selected by a content manager function according to the user's preferences; and
    upon the completion or termination of the clip, the media player window closes and the the application which was on top at the time of playback initiation is again the application that is on top.

2. The method of claim 1 wherein the media file comprises a video file.

3. The method of claim 1 wherein the media file comprises an image file and the playing of the media file comprises a brief display of the image.

4. The method of claim 1 wherein the media file is a file comprising a social media post.

5. The method of claim 1 wherein the audio track of the media file is given priority over audio outputs from other open applications, such that the audio from such other open applications is reduced in volume or fully muted during the playing of the media file.

6. The method of claim 1 wherein the playback initiation command comprises the user's selection of a displayed button, wherein the displayed button comprises a sidebar button or a floating button.

7. The method of claim 1 wherein the playback initiation command comprises a mousepad or touchscreen gesture.

8. The method of claim 1, wherein the playback initiation command comprises a keystroke combination input on a keyboard.

9. The method of claim 1 wherein the media player application is a web browser.

10. The method of claim 1, wherein the media file source comprises a library remote from the device and the media file is streamed from a remote server during playback.

11. The method of claim 1, wherein the clip media file source comprises a memory storage location residing on the device.

* * * * *